US011970333B2

(12) United States Patent
Wu et al.

(10) Patent No.: US 11,970,333 B2
(45) Date of Patent: Apr. 30, 2024

(54) DRY GARBAGE COLLECTION SYSTEM AND METHOD WITH COMPRESSING AND PACKING FUNCTION

(71) Applicant: Nanchang University, Jiangxi (CN)

(72) Inventors: Daishe Wu, Jiangxi (CN); Jianlong Li, Jiangxi (CN); Xuechun Wu, Jiangxi (CN); Yu Xu, Jiangxi (CN)

(73) Assignee: Nanchang University, Nanchang (CN)

( * ) Notice: Subject to any disclaimer, the term of this patent is extended or adjusted under 35 U.S.C. 154(b) by 323 days.

(21) Appl. No.: 17/348,059

(22) Filed: Jun. 15, 2021

(65) Prior Publication Data

US 2021/0309453 A1 Oct. 7, 2021

(30) Foreign Application Priority Data

Apr. 22, 2021 (CN) ........................ 202110435151.X

(51) Int. Cl.
*B65F 1/14* (2006.01)
*B65F 1/00* (2006.01)
*B65F 1/06* (2006.01)

(52) U.S. Cl.
CPC ............ *B65F 1/1405* (2013.01); *B65F 1/002* (2013.01); *B65F 1/065* (2013.01); *B65F 1/067* (2013.01); *B65F 1/068* (2013.01); *B65F 1/1452* (2013.01); *B65F 2210/1443* (2013.01); *B65F 2210/162* (2013.01); *B65F 2210/168* (2013.01); *B65F 2210/179* (2013.01); *B65F 2210/184* (2013.01); *B65F 2210/188* (2013.01)

(58) Field of Classification Search
CPC .......... B65F 1/00; B65F 1/1405; B65F 1/002; B65F 1/1452; B65F 2210/1443; B65F 2210/162; B65F 2210/168; B65F 2210/179; B65F 2210/184; B65F 2210/188
See application file for complete search history.

(56) References Cited

FOREIGN PATENT DOCUMENTS

| | | | | | |
|---|---|---|---|---|---|
| CN | 108502417 | A | * | 9/2018 | .............. B65F 1/065 |
| CN | 108792354 | A | | 11/2018 | |
| CN | 208037253 | U | | 11/2018 | |
| DE | 102019115190 | A1 | * | 12/2020 | .............. B65F 1/062 |
| EP | 2960182 | A1 | * | 12/2015 | ......... B65B 67/1277 |
| EP | 3789319 | A1 | * | 3/2021 | .......... B25J 11/0085 |
| KR | 20120095599 | A | * | 8/2012 | .............. B65F 1/062 |
| WO | WO-2020089798 | A1 | * | 5/2020 | ........... G06F 1/3296 |

* cited by examiner

*Primary Examiner* — Stephen F. Gerrity
*Assistant Examiner* — Linda J Hodge

(57) ABSTRACT

The disclosure discloses a dry garbage collection system and method with compressing and packing function, the system includes a central control display, a garbage putting bin, a compression and hot-melting bin, a packing bin, a forwarding bin, an air purification bin, a garbage can and a box; the garbage put in the system is compressed to form a cake shape and then performed a packing, and the garbage bags are hot-melted to shape, and vacuumized during packing process; the weight of the garbage before and after compression is compared to determine whether there is more wet garbage in the input dry garbage, so that an alarm can be sent out when the garbage classification is not standardized. The present disclosure realizes effectively compression and packing of garbage, significantly reduces the volume of garbage, prevents the garbage bin from overfilling, reduces subsequent garbage transfer times and transportation costs.

10 Claims, 2 Drawing Sheets

DRY GARBAGE COLLECTION SYSTEM AND METHOD WITH COMPRESSING AND PACKING FUNCTION

CROSS-REFERENCE TO RELATED APPLICATIONS

This application is based upon and claims the priority of the Chinese patent application filed on Apr. 22, 2021, with the application number of CN202110435151. X, the entire contents of which are incorporated herein by reference.

TECHNICAL FIELD

The present disclosure relates to the field of garbage collection, especially relates to a dry garbage collection system and method with compressing and packing function.

BACKGROUND

The garbage collection device is a container for garbage, which is of great significance for maintaining indoor and outdoor hygiene, improving the living environment, and promoting social civilization. However, in daily life, problems such as overfilling of garbage bins and leakage of garbage odor often occur, which not only affect the beauty of the environment, but also are not conducive to the prevention and control of the germination and spread of germs. One of the important reasons for the overfilling of the garbage bins is that the garbage put in is not effectively compressed, and the garbage bag is fluffy and takes up a lot of space.

The utility model patent with the announcement number CN208037253U discloses a garbage bin in continuous compression, packing and unloading, which can realize the continuous compression, packing and unloading of garbage. The garbage bin has the following advantages: the size of the packed garbage bag is adjustable, the labor intensity of garbage sorting can be reduced, and saving more materials. The utility model is based on a mechanical structure, which is simple, stable and low in cost.

The invention patent with the publication number CN108792354A discloses an intelligent garbage collection system, specifically, the garbage in a storage device is compressed by a compression device, which can make full use of garbage bags and avoid waste; a tight-mouth device is provided with several buckles for fixing garbage bag, several garbage bags can be put in the storage device once a time, and the garbage bag is automatically packed and unloaded by the storage device.

SUMMARY OF THE INVENTION

The present disclosure provides a dry garbage collection system and method with compressing and packing function, so as to realize efficient compression and packing of garbage, reduce garbage volume, prevent garbage bins from overfilling, reduce the number of subsequent garbage transfer, and reduce transportation costs.

The technical solutions adopted by the present disclosure are:

a dry garbage collection system with compressing and packing function comprises a box, a central control display arranged on the box, and the following components arranged in the box: a garbage putting bin, a compression and hot-melting bin, a packing bin, a forwarding bin, an air purification bin, a garbage can;

the garbage putting bin is arranged at an upper part of the box, the compression and hot-melting bin is communicated with the garbage putting bin, an upper inlet of the packing bin is communicated with a lower outlet of the compression and hot-melting bin, the forwarding bin is communicated with the packing bin, the garbage can is arranged at a side of the forwarding bin, and the air purification bin is communicated with the compression and hot-melting bin;

an induction rotating cover is arranged at an inlet of the garbage putting bin, the induction rotating cover is connected to a first motor, a first infrared sensor is arranged in front of the induction rotating cover, and a second infrared sensor is further arranged in the garbage putting bin;

the compression and hot-melting bin comprises a hydraulic bin, a hydraulic device is installed at an upper part of the hydraulic bin, the hydraulic device is connected to a second motor, a first discharge valve is arranged at a lower part of the hydraulic bin, a weighing device is fixedly arranged on an upper surface of the first discharge valve, and the first discharge valve is connected to a third motor, a level transducer is arranged at a side of the hydraulic bin, a heating device is arranged outside of the hydraulic bin;

a bag box is arranged at an upper end of the packing bin, in which packing bags are stacked up, a packing machine is connected with a lower part of the bag box, a first pushing rod, a first heating wire, a cutter, a second heating wire, a second pushing rod are installed in the packing machine from top to bottom, the first pushing rod and the second pushing rod are arranged vertically with each other, the first pushing rod is connected to a fourth motor, the cutter is connected to a fifth motor, the second pushing rod is connected to a sixth motor, a vacuum chamber is communicated with a lower part of the packing machine, the vacuum chamber is connected to a vacuum pump, the vacuum chamber is further provided with a decompression valve, and a second discharge valve is arranged at a bottom of the vacuum chamber;

the forwarding bin comprises a lifting platform, and sliding grooves are arranged on the lifting platform, both sides of the lifting platform are provided with a sliding rail connected with the lifting platform in a sliding way; several gears and a chain connected therewith in a transmission way are arranged among the sliding rails, a chain connecting rod is fixed on the chain, a front end of the chain connecting rod is passed through the sliding grooves;

the air purification bin comprises an ultraviolet sterilization chamber, an adsorption and treatment chamber and a negative pressure pump, the ultraviolet sterilization chamber and the adsorption and treatment chamber are sequentially communicated with an inlet of the negative pressure pump, an outlet of the negative pressure pump is in communication with the ambient, and the adsorption and treatment chamber is communicated with the hydraulic bin;

the first infrared sensor, the second infrared sensor, the level transducer, the first motor, the second motor, the third motor, the fourth motor, the fifth motor, the sixth motor, the first heating wire, the second heating wire, the heating device, the weighing device and the vacuum pump are all connected to the central control display.

In at least one embodiment, the hydraulic device comprises a hydraulic cylinder arranged at an upper part of the hydraulic bin, a compression plate is connected with a lower end of the hydraulic cylinder, and the hydraulic cylinder is connected to the second motor.

In at least one embodiment, the heating device is an electrically heated coil wounded around an outside of the hydraulic bin.

In at least one embodiment, a cam is arranged below the second discharge valve to control its opening and closing, the cam is connected to a seventh motor, and the seventh motor is connected to the central control display.

In at least one embodiment, the garbage can is arranged at a side of the lifting platform, and located below a maximum height of the lifting platform.

In at least one embodiment, four gears and a chain connected therewith in a transmission way are arranged among the sliding rails, the four gears are distributed in a rectangular shape, one of the gears is connected to an eighth motor, and the eighth motor is connected to the central control display; when the chain connecting rod is driven by the gear to move up and down along a trajectory of the chain, the lifting platform is driven to move up and down between the sliding rails by the chain connecting rod, when the chain connecting rod is driven by the gear to move from left to right along the trajectory of the chain, the packing bag on the lifting platform is pushed into the garbage can by the chain connecting rod, and the chain connecting rod returns to the original position when moving from right to left along the trajectory of the chain.

The present disclosure further provides a dry garbage collection method with compressing and packing function, which is applied to the above dry garbage collection system with compressing and packing function, the method comprises the following steps:

A. putting the garbage when the first infrared sensor is triggered, the weight of the garbage in the compression and hot-melting bin is recorded as G0 at this time;

the induction rotating cover is opened, and is then closed after a duration time t;

B. weighing the garbage when the second infrared sensor is triggered, the count of the garbage bags put in is increased by one;

the weight of the garbage in the compression and hot-melting bin is recorded as G1 at this time;

C. compressing the garbage the hydraulic device is controlled by the central control display to compress the garbage;

D. weighing the garbage again the weight of the compressed garbage in the compression and hot-melting bin is weighed again and recorded as G2;

E. determining types of the garbage the proportion of water that has been squeezed out during the compression process of the recently put garbage is calculated by $x=(G1-G2)/(G1-G0)$, if x is greater than the preset value x0, it is determined that the recently put garbage is mixed with large amount of wet garbage, and the garbage classification is not standardized, an alarm of the non-standard garbage classification is further sent out by the central control display;

F. hot-melting the garbage bags when the count of the garbage bags put in reaches a predetermined number n or the level transducer detects that the put garbage reaches the set level height, the heating device is controlled to start to heat and melt (hot-melt) the garbage bags by the central control display;

stop heating when the heating device is heated to the predetermined temperature T, the first discharge valve is opened to put the garbage bags (that is compressed garbage and melted garbage bags) into the packing bin;

the count of the garbage bags is cleared;

G. packing in vacuum the vacuum pump is controlled to rotate reversely to inflate the vacuum chamber by the central control display;

the packing machine is started to pack the compressed garbage; after the packing is completed, the second discharge valve is opened to put a packing bag containing the compressed garbage on the lifting platform located in the forwarding bin;

H. relaying the packing bag in the packing bin the vacuum pump is started and controlled to rotate forward by the central control display to vacuumize the vacuum chamber, so that the packing bag in the bag box is sucked into the vacuum chamber and is relaid against the inner wall of the vacuum chamber;

I. forwarding the garbage the packing bag containing the compressed garbage is lifted by the lifting platform, and pushed into the garbage can with the help of the chain connecting rod.

In some embodiments, the duration time t for opening the induction rotating cover is 3-10 s.

In some embodiments, the predetermined number n of the count of the garbage bags is 3-20 times.

In some embodiments, the predetermined temperature T of the heating coil (the heating device) is 130-250° C.

In some embodiments, the preset value x0 is 2-10%.

The present disclosure has the following advantages:

(1) the garbage is compressed at high magnification without rebounding. First, the garbage put into the garbage collection system is compressed at high magnification by a hydraulic device to form a cake shape; then, one or more cake-shape garbage are packed. In order to suppress the expansion and rebound of the compressed garbage volume during the packing process or after packing, the garbage bags are hot-melted before the packing process to finalize the shape of the garbage; in order to avoid air bulging in the packing bags after packing, the packing bag is vacuumized in the packing process, which effectively improves the compaction of the garbage. Finally, through the technical solution of hydraulic compression, vacuumize-hot-melt packing, the high-times compressed volume of the garbage does not rebound.

(2) wet garbage alarm. The weight of the garbage before and after compression is weighed by the weighing device and compared, whether there is more wet garbage in the dry garbage is determined by calculating the proportion of the water squeezed out from the garbage, so that an alarm can be sent out when the garbage classification is not standardized, which is beneficial for garbage classification.

(3) The structure is simple and the device is small. The outlet of the vacuum pump is used to lay the garbage packing bags for the packing process to realize the dual use of one pump, which is beneficial to save installation space and reduce manufacturing cost. The garbage forwarding bin has an ingenious structure, using only one motor as power, and the motor drives the chain and the chain connecting rod thereon to run in one direction without reversing, so that the garbage is lifted and pushed into the garbage can, the chain connecting rod and the lifting platform return to the original position, thus the simple structure and control realize multiple functions.

(4) The garbage is in airtight package to prevent gas and liquid leakage, and fully protect the health of operators in the garbage collection, transfer and processing links.

BRIEF DESCRIPTION OF FIGURES

The present disclosure will be further described below with reference to the accompanying drawings and specific embodiments.

Figure 1:
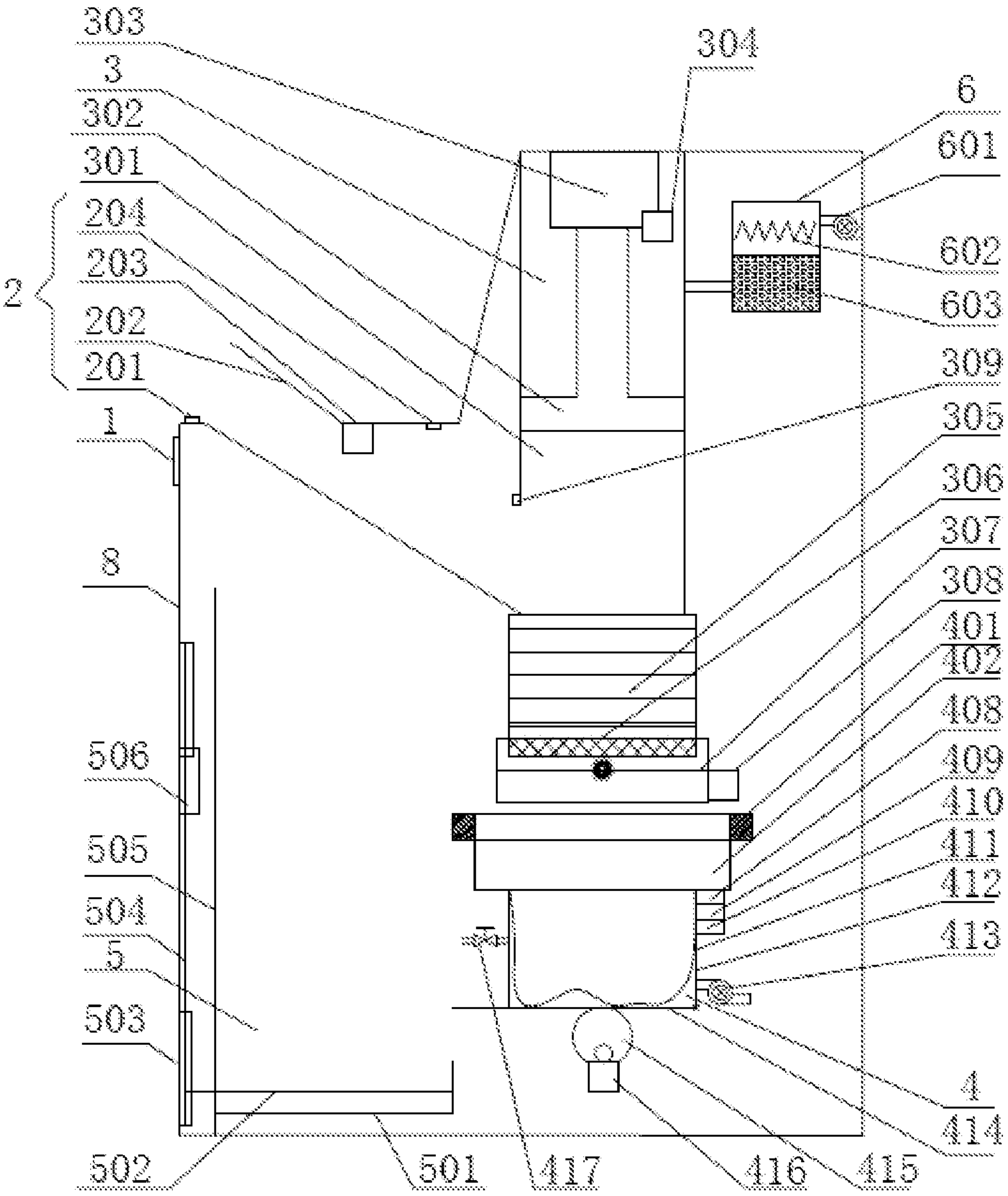
FIG. 1 shows a schematic diagram of the garbage collection system.

1. central control display, 2. garbage putting bin, 3. compression and hot-melting bin, 4. packing bin, 5. forwarding bin, 6. air purification bin, 7. garbage can, 8. box;

201. first infrared sensor, 202. induction rotating cover, 203. first motor, 204. second infrared sensor, 301. hydraulic bin, 302. compression plate, 303. hydraulic cylinder, 304. second motor, 305. electrically heated coil, 306. electronic scale, 307. first discharge valve, 308. third motor, 309. level transducer, 401. bag box, 402. packing machine, 403. first pushing rod, 404. first heating wire, 405. cutter, 406. second heating wire, 407. second pushing rod, 408. fourth motor, 409. fifth motor, 410. sixth motor, 411. packing bag, 412. vacuum chamber, 413. vacuum pump, 414. second discharge valve, 415. cam, 416. seventh motor, 417. decompression valve, 501. lifting platform, 502. chain connecting rod, 503. gear, 504. chain, 505. sliding rail, 506. eighth motor, 507. sliding groove, 601. negative pressure pump, 602. ultraviolet sterilization chamber, 603. adsorption and treatment chamber.

DETAILED DESCRIPTION

As far as inventors known, the existing garbage collection system has no hot-melting function, especially the compressed garbage is apt to rebound, further influence compression efficiency. Some disclosure do not consider the rebound of the compressed garbage, thus the rupture of the garbage bag caused by the rebound can not be avoided.

Clear and intact description of some embodiments of the disclosure is made in combination with drawings below. Obviously, the described embodiments are only a part of the embodiments of the disclosure, without covering all embodiments, and each embodiment can be combined freely to form new embodiments. Based on the embodiments of the present disclosure, all the other embodiments obtained by those skilled in the art without inventive effort are within the scope of the present disclosure.

In the descriptions of the present disclosure, it should be understood that the azimuth or position relationships indicated by the terms “upper side”, “lower side”, “upper end”, “two end”, “width”, “height”, “upper”, “lower”, “front”, “rear”, “left”, “right”, “vertical”, horizontal”, “top”, “bottom”, “inside”, “outside”, and the like are the azimuth or position relationships as shown in the drawings, and are only intended to facilitate the description of the present disclosure and simplify the description, but not to indicate or imply that the designated devices or elements must have a specific azimuth or are constructed and operated in a specific azimuth. Therefore, the terms cannot be considered to limit the present disclosure.

Embodiment 1

Figure 2:
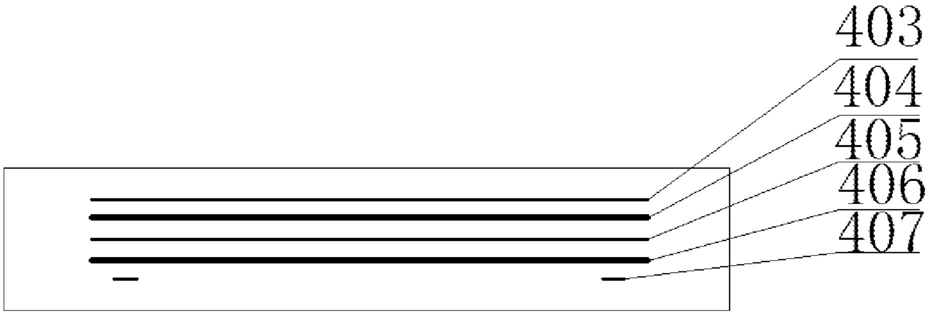
FIG. 2 shows a simplified schematic diagram of the internal structure of the packing machine.
Figure 3:
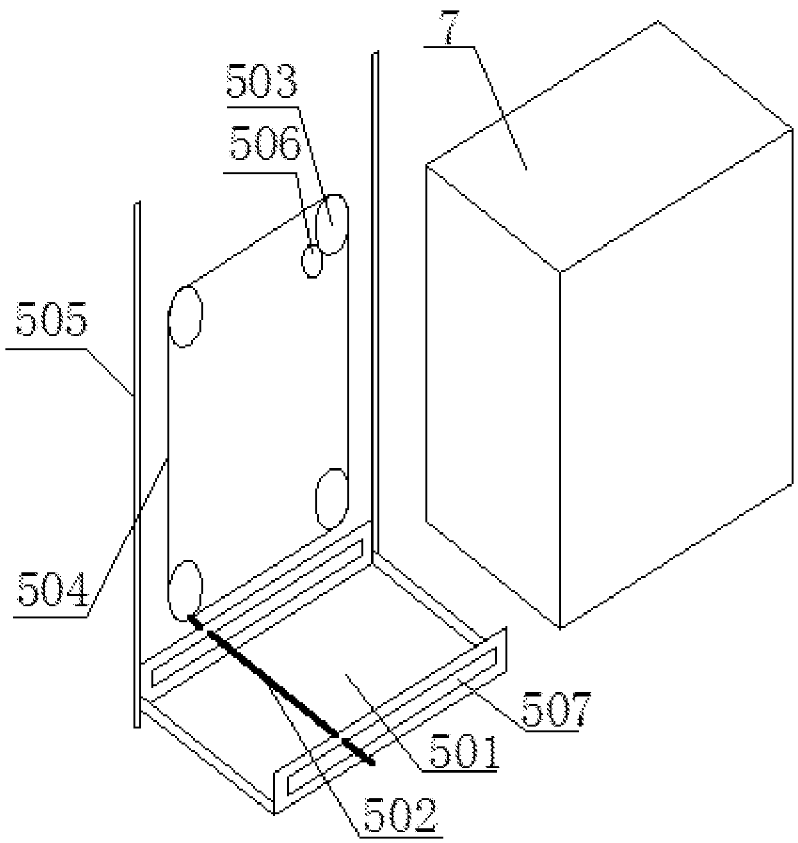
FIG. 3 shows a location relation diagram of the forwarding bin and the garbage can.
Figure 4:
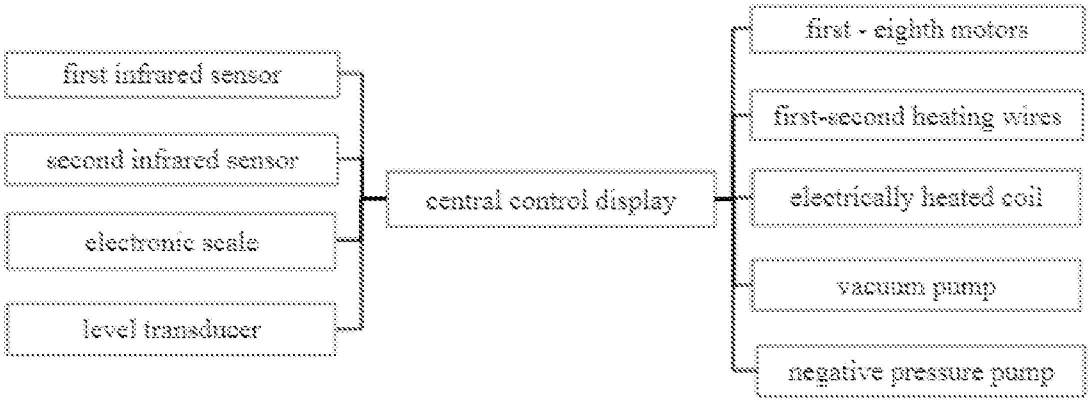
FIG. 4 shows a connection structure diagram of the central control display; In the drawings.

Refer to FIG. 1-4, the present embodiment provides a dry garbage collection system with compressing and packing function, the system comprises a box 8, a central control display 1 arranged on the box 8, and the following components arranged in the box 8: a garbage putting bin 2, a compression and hot-melting bin 3, a packing bin 4, a forwarding bin 5, an air purification bin 6, a garbage can 7;

the garbage putting bin 2 is arranged in the front end of the whole system, the compression and hot-melting bin 3 is communicated with the garbage putting bin 2, the upper inlet of the packing bin 4 is communicated with the lower outlet of the compression and hot-melting bin 3, the forwarding bin 5 is communicated with the packing bin 4, the garbage can 7 is arranged below the upper outlet of the forwarding bin 5, and the air purification bin 6 is communicated with the compression and hot-melting bin 3;

the garbage putting bin 2 comprises a first infrared sensor 201, an induction rotating cover 202, a first motor 203 and a second infrared sensor 204; the induction rotating cover 202 is arranged at the inlet of the garbage putting bin 2, the first infrared sensor 201 is arranged in front of the induction rotating cover 202, the induction rotating cover 202 is connected to the first motor 203, and the second infrared sensor 204 is arranged in the garbage putting bin 2;

the compression and hot-melting bin 3 comprises a hydraulic bin 301, a compression plate 302, a hydraulic cylinder 303, a second motor 304, an electrically heated coil 305, an electronic scale 306, a first discharge valve 307, a third motor 308, and a level transducer 309; the level transducer 309 is arranged at a side of the hydraulic bin 301 to avoid the garbage superelevation and overfilling, the compression plate 302 is installed in the upper part of the hydraulic bin 301, the hydraulic cylinder 303 is connected with the upper part of the compression plate 302, the second motor 304 is connected to the hydraulic cylinder 303, the electrically heated coil 305 is wound around the outside of the hydraulic bin 301, the first discharge valve 307 is arranged at the lower part of the hydraulic bin 301, the third motor 308 is connected to the first discharge valve 307, and the upper surface of the first discharge valve 307 is provided with the electronic scale 306;

the packing bin 4 comprises a bag box 401, a packing machine 402, a first pushing rod 403, a first heating wire 404, a cutter 405, a second heating wire 406, a second pushing rod 407, a fourth motor 408, a fifth motor 409, a sixth motor 410, a packing bag 411, a vacuum chamber 412, a vacuum pump 413, a second discharge valve 414, a cam 415, a seventh motor 416, a decompression valve 417; the bag box 401 is arranged at the upper end of the packing bin 4, the bag box 401 is a square ring shape box, the packing bags 411 are stacked up in the bag box 401, the packing machine 402 is connected with the lower side of the bag box 401, the first pushing rod 403, first heating wire 404, cutter 405, second heating wire 406, second pushing rod 407 are installed in the packing machine 402 from top to bottom, the first pushing rod 403 and the second pushing rod 407 are arranged vertically with each other in the horizontal direction, the first pushing rod 403 and the second pushing rod 407 are respectively connected to the fourth motor 408 and the sixth motor 410, the cutter 405 is connected to the fifth motor 409, the lower side of the packing machine 402 is communicated with the vacuum chamber 412, the vacuum chamber 412 is connected to the vacuum pump 413, the vacuum chamber 412 is further provided with a decompression valve 417; the second discharge valve 414 is arranged at the bottom of the vacuum chamber 412, the second discharge valve 414 is fixed on the cam 415, and the cam 415 is connected to the seventh motor 416;

the forwarding bin 5 comprises a lifting platform 501, a chain connecting rod 502, a gear 503, a chain 504, a sliding rail 505, a sliding groove 507 and an eighth motor 506; the lifting platform 501 is arranged in the forwarding bin 5, the upper side of the lifting platform 501 is welded with the sliding grooves 507, the front end of the chain connecting rod 502 is passed through the hollow of the sliding grooves 507, the rear end of the chain connecting rod 502 is fixed on the chain 504 and moves with the chain 504, the chain 504 is connected with four gears 503 in a transmission way, the four gears 503 are distributed in a rectangular shape, one of the gears 503 is connected to the eighth motor 506, both sides of the lifting platform 501 are fitted and connected with the sliding rails 505 in a sliding way; when the chain connecting rod 502 is driven by the gear 503 to move up and down along the trajectory of the chain 504, the lifting platform 501 is driven to move up and down between the sliding rails 505 by the chain connecting rod 502, when the chain connecting rod 502 is driven by the gear 503 to move from left to right along the trajectory of the chain 504, the packing bag 411 on the lifting platform 501 is pushed into the garbage can 7 by the chain connecting rod 502; and when the chain connecting rod 502 is driven by the gear 503 to move from right to left along the trajectory of the chain 504, the chain connecting rod 502 returns to the original position (referring to locating on the left side of the lifting platform 501, that is the initial position);

the air purification bin 6 comprises a negative pressure pump 601, an ultraviolet sterilization chamber 602 and an adsorption and treatment chamber 603, the ultraviolet sterilization chamber 602 and the adsorption and treatment chamber 603 are sequentially communicated with the inlet of the negative pressure pump 601, the outlet of the negative pressure pump 601 is in communication with the ambient, and the adsorption and treatment chamber 603 is communicated with the hydraulic bin 301.

The above first infrared sensor 201, second infrared sensor 204, level transducer 309, first motor 203, second motor 304, third motor 308, fourth motor 408, fifth motor 409, sixth motor 410, seventh motor 416, eighth motor 506, first heating wire 404, second heating wire 406, electrically heated coil 305, vacuum pump 413, negative pressure pump 601 and electronic scale 306 are all connected to the central control display 1.

Embodiment 2

A dry garbage collection method provided by this embodiment is applied to the dry garbage collection system with compressing and packing function in the Embodiment 1.

A dry garbage collection method with compressing and packing function comprises the following steps:

A. putting the garbage (into the garbage putting bin 2)

when the first infrared sensor 201 is triggered, the weight of the garbage in the compression and hot-melting bin 3 is recorded as G0 at this time;

the induction rotating cover 202 is opened, and is then closed after a duration time t;

B. weighing the garbage when the second infrared sensor 204 is triggered, the count of the garbage bags put in is increased by one;

the weight of the garbage in the compression and hot-melting bin 3 is recorded as G1 at this time;

C. compressing the garbage the hydraulic device is controlled by the central control display 1 to compress the garbage;

D. weighing the garbage again the weight of the compressed garbage in the compression and hot-melting bin 3 is weighed again and recorded as G2;

E. determining types of the garbage the proportion of water that has been squeezed out during the compression process of the recently put garbage is calculated by $x=(G1-G2)/(G1-G0)$, if x is greater than the preset value x0, it is determined that the recently put garbage is mixed with large amount of wet garbage, and the garbage classification is not standardized, and an alarm of non-standard garbage classification is further sent out by the central control display 1;

F. hot-melting the garbage bags when the count of the garbage bags put in reaches a predetermined number n or the level transducer 309 detects that the put garbage reaches the set level height, the heating device is controlled to start to heat and melt the garbage bags by the central control display 1;

stop heating when the heating device is heated to the predetermined temperature T, the first discharge valve 307 is opened to put the garbage bags (that is compressed garbage and melted garbage bags) into the packing bin 4;

the count of the garbage bags is cleared;

G. packing in vacuum the vacuum pump 413 is controlled to rotate reversely to inflate the vacuum chamber 412 by the central control display 1;

the packing machine 402 is started to pack the compressed garbage; after the packing is completed, the second discharge valve 414 is opened to put the packing bag 411 containing compressed garbage on the lifting platform 501 located in the forwarding bin 5;

H. relaying the packing bag in the packing bin 4 the vacuum pump 413 is started and controlled to rotate forward by the central control display 1 to vacuumize the vacuum chamber 412, so that the packing bag 411 in the bag box 401 is sucked into the vacuum chamber 412 and is relaid against the inner wall of the vacuum chamber 412;

I. forwarding the garbage the packing bag 411 containing compressed garbage is lifted by the lifting platform 501, and pushed into the garbage can 7 with the help of the chain connecting rod 502.

In some embodiments, the duration time t for opening the induction rotating cover 202 is 3-10 s.

In some embodiments, the predetermined number n of the count of the garbage bags is 3-20 times.

In some embodiments, the predetermined temperature T of the heating coil 305 (the heating device) is 130-250° C.

In some embodiments, the preset value x0 is 2-10%.

Embodiment 3

The central control display 1 is started after connecting to the power supply, trigger the first infrared sensor 201 by the hand or an object, after the first infrared sensor 201 receiving the signal, the central control display 1 records the weight of the garbage in the compression and hot-melting bin 3 as G0, at the same time, controls the first motor 203 to open the induction rotating cover 202 and last for 5 s, then put garbage into the garbage putting bin 2.

During the garbage entering the hydraulic bin 301, a signal is sent to the central control display 1 by the second infrared sensor 204 in the garbage putting bin 2 after sensing the passage of the garbage, the central control display 1 counts up by 1, and reads the readings of the electronic scale 306 and records it as G1.

The second motor 304 is started, and the second motor 304 controls the compression plate 302 to reciprocate by controlling the hydraulic cylinder 303. After a compression is completed, the central control display 1 reads the readings of the electronic scale 306 and records it as G2.

The ratio of mass change before and after compression x=(G1−G2)/(G1−G0), if x=7%, which is greater than the preset value x0, such as x0=5%, it is determined that the recently put garbage is mixed with large amount of wet garbage, and the garbage classification is not standardized, an alarm of the non-standard garbage classification is further sent out by the central control display 1. A water storage pipe and a drainage valve are communicate with the bottom of the compression and hot-melting bin 3, after receiving the alarm, the drainage valve is opened to drain out the liquid compressed out from the wet garbage mixed in; under normal circumstances, the garbage classification is standardized, since the system is mainly for dry garbage collection and processing, there is no need to open the drain valve.

Continue to put garbage, and compress the garbage by the hydraulic cylinder 303. When the garbage put in reaches a predetermined number, such as 6 times, or the level transducer 309 detects that the garbage reaches the set level height, the central control display 1 activates the electrically heated coils 305 to start heating. When the temperature of the electrically heated coil 305 reaches a predetermined temperature, such as 160° C., the garbage bag in the hydraulic bin 301 undergoes hot-melting and shrinkage, and the garbage in the garbage bag is maintained in a compressed state without rebounding.

the central control display 1 controls the third motor 308 to open the first discharge valve 307, so that the garbage enters the packing bin 4 from the compression and hot-melting bin 3, and the count of the garbage bags put in is cleared.

In the packing bin 4, the packing bag 411 is extended from the bag box 401, and laid in the vacuum chamber 412, so that the garbage bags (that is compressed garbage and melted garbage bags) from the compression and hot-melting bin 3 are directly wrapped by the packing bag 411.

the vacuum pump 413 is controlled to rotate reversely to inflate the vacuum chamber 412, at this time, the gap between the packing bag 411 with garbage and the vacuum chamber 412 is enlarged, and the air in the packing bag 411 is squeezed out, so that the packing bag 411 more densely wraps the garbage inside. If the vacuum pump 413 provides too much gas and the pressure is too high, the decompression valve 417 is opened to prevent the packing bag 411 extending from the bag box 401 from being displaced or broken.

Start the packing machine 402 to pack the compressed garbage, the fourth motor 408 and the sixth motor 410 are controlled by the central control display 1 to respectively drive the first pushing rod 403 and the second pushing rod 407 to move horizontally perpendicular to each other at different heights, so as to tighten the packing bag 411, and finally the packing bag 411 is closed at a fixed corner, during this process, the vacuum pump 413 continually to inflate to ensure the excess air in the packing bag 411 is squeezed out.

The vacuum pump 413 stops working.

Subsequently, the first heating wire 404 and the second heating wire 406 simultaneously heats and melts the fixed corner, then the fifth motor 409 is started to drive the cutter 405 between the first heating wire 404 and the second heating wire 406 to cut the closed position, the garbage packing is completed.

The central control display 1 controls the seventh motor 416 to start operation, the second discharge valve 414 is opened and the packing bag 411 containing compressed garbage falls on the lifting platform 501 located in the forwarding bin 5.

The central control display 1 controls the vacuum pump 413 to rotate forward, the vacuum chamber 412 is vacuumized, so that the packing bag in the bag box 401 is sucked into the vacuum chamber 412 and clings to the inner wall of the vacuum chamber 412, thereby completing laying the packing bag for the next garbage packing.

At the same time, the eighth motor 506 is started, the chain 504 is driven by the gear 503 to rotate a full turn, the chain connecting rod 502 moves synchronously with the chain 504. When the chain connecting rod 502 moves from bottom to top, it drives the sliding groove 507 to drive the lifting platform 501 to move upward; when the chain connecting rod 502 located upward moves from left to right, the lifting platform 501 does not move, the chain connecting rod 502 only moves in the sliding groove 507 from left to right, which pushes the packing bag 411 located on the lifting platform 501 to move from left to right and fall into the garbage can 7; when the chain connecting rod 502 moves from top to bottom, it drives the sliding groove 507 to drive the lifting platform 501 to move downward; when the chain connecting rod 502 located downward moves from right to left, the lifting platform 501 does not move, the chain connecting rod 502 only moves horizontally in the sliding groove 507 of the lifting platform 501, at this point, the chain 504 has completed one turn, the chain connecting rod 502 and the lifting platform 501 both return to the original position and complete the transfer of the garbage on the lifting platform 501 to the garbage can 7.

Finally, it should be noted that the above description is only some embodiments of the disclosure, and is not used to limit the disclosure. Although the disclosure is described in detail with reference to the foregoing embodiments, those skilled in the art can still modify the technical solutions described in the foregoing embodiments, or equivalently replace some of the technical features. Any modification, equivalent replacement, improvement, or the like made within the spirit and principle of the disclosure shall fall within the protection scope of the disclosure.

We claim:

1. A dry garbage collection system with compressing and packing functions, comprising a housing and arranged inside of the housing a garbage putting bin, a compression and hot-melting bin, a packing bin, a forwarding bin and a garbage can; the system further comprises a central control display, and the central control display is arranged on the housing;

the garbage putting bin is arranged at an upper part of the housing, the compression and hot-melting bin is communicated with the garbage putting bin, an upper inlet of the packing bin is communicated with a lower outlet of the compression and hot-melting bin, the forwarding bin is communicated with the packing bin, and the garbage can is arranged at a side of the forwarding bin;

an induction rotating cover is arranged at an inlet of the garbage putting bin, the induction rotating cover is connected to a first motor, a first infrared sensor is arranged in front of the induction rotating cover, and a second infrared sensor is further arranged in the garbage putting bin;

the compression and hot-melting bin comprises a hydraulic bin, a hydraulic device is installed at an upper part of the hydraulic bin, the hydraulic device is connected to a second motor, a first discharge valve is arranged at a lower part of the hydraulic bin, a weighing device is fixedly arranged on an upper surface of the first discharge valve, and the first discharge valve is connected to a third motor, a level transducer is arranged at a side of the hydraulic bin, a heating device is arranged outside of the hydraulic bin;

the packing bin is configured to comprise a bag box and a packing machine, wherein the bag box is arranged at an upper end of the packing bin, packing bags are stacked up in the bag box, the packing machine is connected with a lower part of the bag box, a first pushing rod, a first heating wire, a cutter, a second heating wire, a second pushing rod are installed in the packing machine from top to bottom, the first pushing rod and the second pushing rod are arranged vertically with each other, the first pushing rod is connected to a fourth motor, the cutter is connected to a fifth motor, the second pushing rod is connected to a sixth motor, a vacuum chamber is communicated with a lower part of the packing machine, the vacuum chamber is connected to a vacuum pump, the vacuum chamber is further provided with a decompression valve, and a second discharge valve is arranged at a bottom of the vacuum chamber;

the forwarding bin comprises a lifting platform, and sliding grooves are arranged on the lifting platform, both sides of the lifting platform are provided with a sliding rail connected with the lifting platform by a sliding connection; gears and a chain connected therewith by a transmission connection are arranged among the sliding rails, a chain connecting rod is fixed on the chain, a front end of the chain connecting rod is passed through the sliding grooves;

the first infrared sensor, the second infrared sensor, the level transducer, the first motor, the second motor, the third motor, the fourth motor, the fifth motor, the sixth motor, the first heating wire, the second heating wire, the heating device, the weighing device and the vacuum pump are all connected to the central control display.

2. The dry garbage collection system with compressing and packing functions according to claim 1, wherein the housing further comprises an air purification bin, the air purification bin comprises an ultraviolet sterilization chamber, an adsorption and treatment chamber and a negative pressure pump, the ultraviolet sterilization chamber and the adsorption and treatment chamber are sequentially communicated with an inlet of the negative pressure pump, an outlet of the negative pressure pump is in communication with an outside of the air purification bin, and the adsorption and treatment chamber is communicated with the hydraulic bin.

3. The dry garbage collection system with compressing and packing functions according to claim 1, wherein the hydraulic device comprises a hydraulic cylinder, the hydraulic cylinder is arranged at an upper part of the hydraulic bin, a compression plate is connected with a lower end of the hydraulic cylinder, and the hydraulic cylinder is connected to the second motor; the heating device is an electrically heated coil, and the electrically heated coil is wound around an outside of the hydraulic bin.

4. The dry garbage collection system with compressing and packing functions according to claim 1, wherein a cam is arranged below the second discharge valve to control its opening and closing, the cam is connected to a seventh motor, and the seventh motor is connected to the central control display.

5. The dry garbage collection system with compressing and packing functions according to claim 1, wherein the garbage can is arranged at a side of the lifting platform, and located below a maximum height of the lifting platform.

6. A dry garbage collection method with compressing and packing functions, wherein the method is applied to the dry garbage collection system with compressing and packing functions of claim 1, the method comprises the following steps:

A. disposal of garbage:

when the first infrared sensor is triggered, recording a weight of the garbage in the compression and hot-melting bin as G0 at this time; opening the induction rotating cover, and then closing it after a duration time t;

B. weighing of the garbage:

when the second infrared sensor is triggered, increasing a count of the garbage bags put in by one;

recording the weight of the garbage in the compression and hot-melting bin as G1 at this time;

C. compression of the garbage:

controlling the hydraulic device by the central control display to compress the garbage;

D. weighing of the compressed garbage:

weighing a weight of compressed garbage in the compression and hot-melting bin again and recording as G2;

E. determination of the type of garbage:

calculating a proportion of water squeezed out during a compression process of recently put garbage by $x=(G1-G2)/(G1-G0)$, if x is greater than a preset value x0, determining that the recently put garbage is mixed with a large amount of wet garbage, and a garbage classification is not standardized, and sending out an alarm of a non-standard garbage classification by the central control display;

F. hot-melting of garbage bags:

when the count of the garbage bags put in reaches a predetermined number n or the level transducer detects that the put garbage reaches a set level height, controlling the heating device by the central control display to perform hot-melting on the garbage bags;

stopping heating when the heating device is heated to a predetermined temperature T, opening the first discharge valve to put the garbage bags into the packing bin; clearing the count of the garbage bags;

G. packing in vacuum:

controlling the vacuum pump to rotate reversely to inflate the vacuum chamber by the central control display;

starting the packing machine to pack a compressed garbage; after a packing is completed, opening the second discharge valve to put a packing bag containing the compressed garbage on the lifting platform located in the forwarding bin;

H. laying of a new packing bag in the packing bin:

controlling the vacuum pump to start and rotate forward by the central control display to vacuumize the vacuum chamber, so that a new packing bag in the bag box is sucked into the vacuum chamber and is laid on an inner wall of the vacuum chamber;

I. transmission of the garbage:

lifting the packing bag containing the compressed garbage by the lifting platform, and pushing it into the garbage can with a help of the chain connecting rod.

7. The dry garbage collection method with compressing and packing functions according to claim 6, wherein the duration time t for opening the induction rotating cover is 3-10s.

8. The dry garbage collection method with compressing and packing functions according to claim 6, wherein the predetermined number n of the count of the garbage bags is 3-20 times.

9. The dry garbage collection method with compressing and packing functions according to claim 6, wherein the predetermined temperature T of the heating device is 130-250 C.

10. The dry garbage collection method with compressing and packing functions according to claim 6, wherein the preset value x0 of the proportion of water that has been squeezed out during the compression process of the put garbage is 2-10%.

* * * * *